(12) United States Patent
Stouffer et al.

(10) Patent No.: US 7,069,127 B2
(45) Date of Patent: *Jun. 27, 2006

(54) PROGRAMMABLE ELECTRONIC DEVICE

(75) Inventors: Peter Stouffer, Holly, MI (US); David Rupert, Highland, MI (US); David Showalter, Royal Oak, MI (US); Richard Graham, Oak Park, MI (US); Mark Cohrs, Madison Heights, MI (US); Ralph Girardin, Algonac, MI (US); Joseph Allio, Macomb, MI (US); Michael Foy, Plymouth, MI (US); Steven Schroeder, Harrison Township, MI (US); Anthony Whitehead, Royal Oak, MI (US); Gregg Gagnon, Roseville, MI (US); Valeriy Bodrov, Farmington Hills, MI (US)

(73) Assignee: Audiovox Electronics Corp., Hauppauge, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 10/085,791

(22) Filed: Feb. 28, 2002

(65) Prior Publication Data

US 2005/0017852 A1    Jan. 27, 2005

Related U.S. Application Data

(63) Continuation of application No. 09/907,744, filed on Jul. 19, 2001, now Pat. No. 6,697,719.

(51) Int. Cl.
*G06F 7/00* (2006.01)
(52) U.S. Cl. ...................................... 701/36
(58) Field of Classification Search ............... 701/1, 701/29, 33, 36; 307/9.1, 10.1; 715/961
See application file for complete search history.

(56) References Cited

U.S. PATENT DOCUMENTS

| 5,479,157 | A | * | 12/1995 | Suman et al. | 340/5.28 |
| 6,028,533 | A | * | 2/2000 | Javors | 340/825.72 |
| 6,697,719 | B1 | * | 2/2004 | Stouffer et al. | 701/36 |

OTHER PUBLICATIONS

U.S. Appl. No. 09/907,744, Stouffer.

* cited by examiner

*Primary Examiner*—Yonel Beaulieu
(74) *Attorney, Agent, or Firm*—F. Chau & Associates, LLC

(57) ABSTRACT

A feature set module for programming features of a vehicle control system is disclosed. The feature set module is designed to be easily attached to or detached from an interface module of a control system. The feature set module may include a latching mechanism to secure the feature set module to the interface module. Additionally, the feature set module has terminals that communicate with terminals of the interface module.

23 Claims, 7 Drawing Sheets

PROGRAMMABLE ELECTRONIC DEVICE

This application is a continuation of the U.S. utility patent application having a Ser. No. 09/907,744, entitled Programmable Electronic Device, filed Jul. 19, 2001 now U.S. Pat. No. 6,697,719, which is incorporated herein by reference in its entirety.

FIELD OF THE INVENTION

The present invention relates generally to an apparatus for adding functionality to an electronic device and/or system. More particularly, the present invention relates to a module for use with a vehicle control device and/or system. The module may include a latching mechanism to secure the module to the electronic device and/or a pin or receptacle connector designed for communication between the module and the electronic device, such as a vehicle control device.

BACKGROUND OF THE INVENTION

In general, electronic devices are utilized to provide a variety of functions to a user. As technology evolves and/or as users needs evolve, there may be a need or desire to change and/or upgrade the functions that an electronic device can provide.

For example, vehicle security and alarm systems provide a user with specific functions, according to the design and features of the vehicle security and alarm system. Vehicle alarm and security systems are either pre-installed during the manufacturing of the vehicle or purchased and installed as aftermarket items.

Currently, if a user desires functions that are not provided in an original equipment alarm, an aftermarket security and alarm system would need to be purchased.

Users are also faced with limited options or feature sets for alarms. They must either choose the factory installed vehicle security and alarm system or choose an aftermarket vehicle security and alarm system that ordinarily provide a pre-determined set of features. Thus, if a user desires features that are not included in the pre-determined set of features, or if the features desired by a user change, the user would need to install a different vehicle security and alarm system. In addition, as technology changes, users who desire to acquire functions which incorporate evolved technology need to acquire a new system that incorporates the evolved technology.

It is therefore desirable to provide an electronic device and/or system that can be updated to change, add, or remove functions that the electronic device can provide. For example, it is desirable to provide a vehicle control system and/or device that can be utilized to provide a variety of security, alarm, comfort and convenience functions related to a vehicle and/or a user of a vehicle, as a user's needs change or as new functions become available in the marketplace.

It is also desirable to provide a module that is easily attached or removed from an electronic device such as a vehicle security, alarm, or control device. In addition, it is desirable to provide a module that is capable of augmenting or interfacing with other electronic devices. Further, it is desirable to provide a module that is capable of providing functions that can interface with functions provided by other electronic devices. For example, it is desirable to provide a module for a vehicle control device that is capable of interfacing or coexisting with different vehicle control devices, such as those made by different manufacturers.

Also, it is desirable to provide a module that is capable of delivering a variety of functions, in type and quantity, for an electronic device, such as a vehicle alarm, security or control system.

SUMMARY OF THE INVENTION

In one aspect of the invention a vehicle control system is provided that includes an interface module connected to electronic input and output devices and a feature set module for detachably coupling to the interface unit, wherein the interface unit contains programming for controlling functions of said alarm system.

In another aspect of the invention a method of modifying functions of a vehicle alarm system includes steps of removing a first feature set module from an alarm system and replacing the first feature set module with a second feature set module programmed to provide different functionality.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENTS

Figure 1:
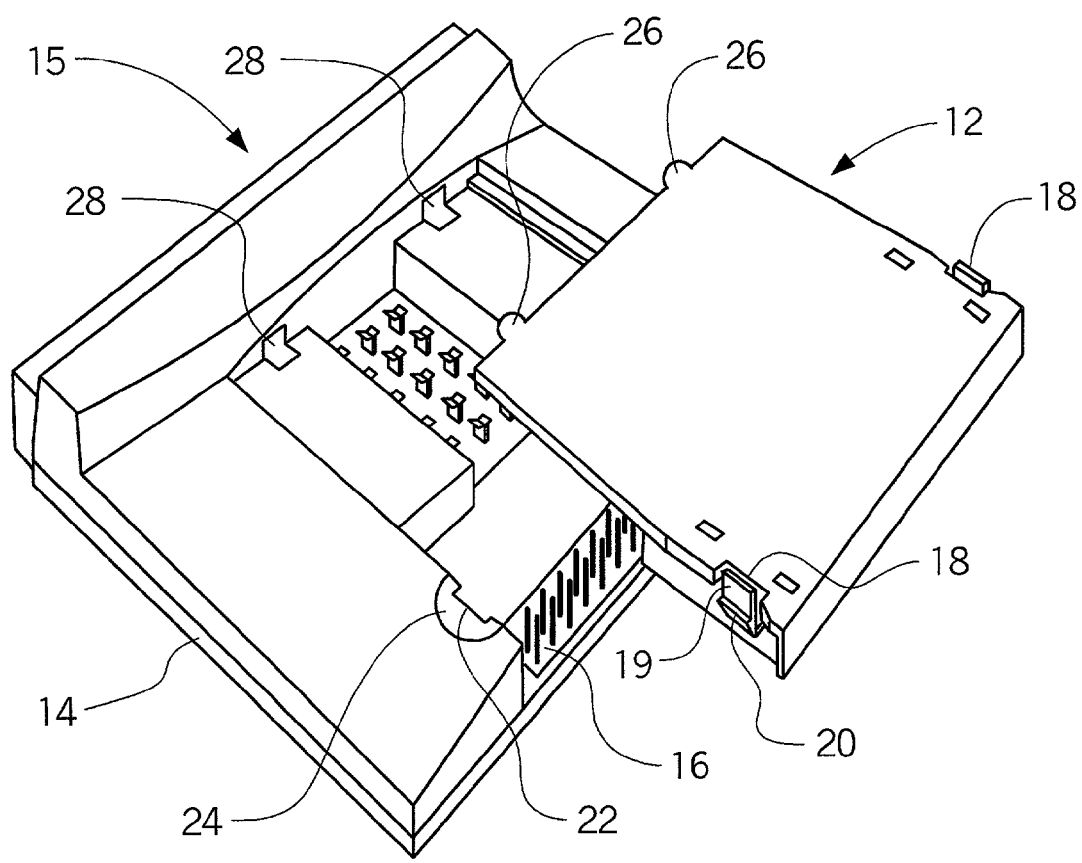
FIG. 1 is a perspective view of an alarm system in accordance with the present invention.

Referring now to the figures wherein like reference numerals indicate like elements, in FIG. 1 there is shown a vehicle control and alarm system 10, including an interface module 15 and a feature set module 12. The feature set module 12 may include a computer processor and/or memory storing device that can be utilized to define the functions/features of the alarm system. Additionally, the feature set module 12 may include computer processing hardware and/or software that are replaceable and/or capable of being upgraded, converted or configured differently. Thus, the feature set module 12, according to the present invention, is able to provide a multitude of alarm features.

FIG. 1 illustrates the control system 10, which includes an exemplary embodiment of the feature set module 12, in accordance with the present invention, that may be coupled to interface module 15 to provide alarm features. The module 12 includes one or more structures for securing the module 12 to the housing 14 of the interface module 15.

Figure 7:
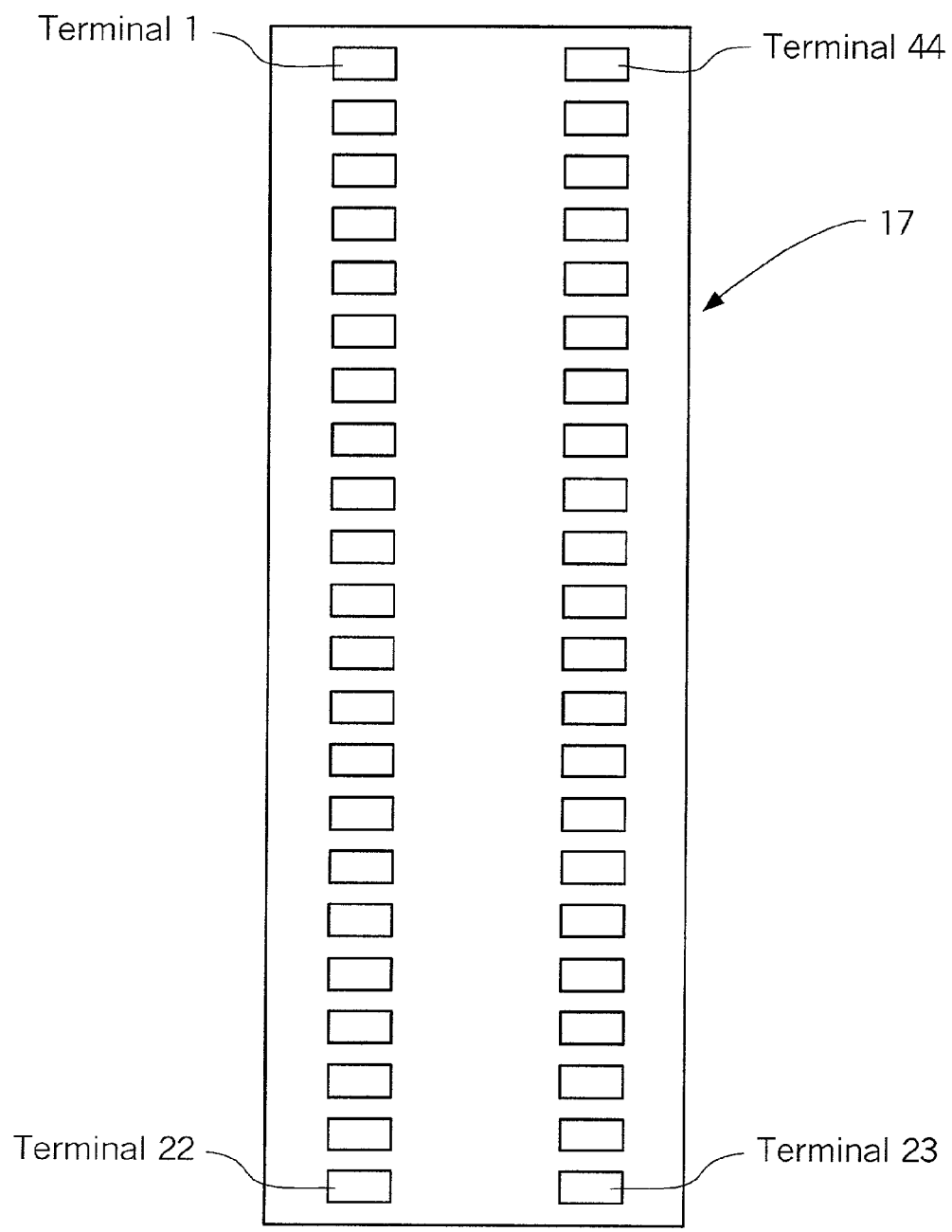
FIG. 7 is a plan view of a connector of a feature set module, in accordance with the present invention.

For example, the module 12 may be attached to the housing 14 by a housing port 16, which may be a pin or receptacle connector on the housing 14, that can accept the module 12. In an exemplary embodiment, the module 12 may include a module port 17 (FIG. 7). The module port 17 may include a pin receptacle connector with up to 40 pin receptacles, and the housing port 16 of the housing 14 may include a 40-pin connector. It should be understood that the connector 17 and pin connector 16 could be provided with more, or less, than 40 pins depending on the features to be provided by the control system, and the connection established may be a serial or parallel connection. For example, FIG. 7 illustrates an embodiment with a 44-pin connector. The housing port 16 and the module port 17 may have any number or type of terminal. The housing port 16 serves as the mechanism for establishing communication between the interface module 15 and the feature set module 12.

The module 12 may also be attached to the housing 14 by one or more locking members 18. In an exemplary embodiment, the housing of the feature set module and the locking members are a molded plastic. Each of the locking members has a first end connected to the housing and a second free end 19. Applying pressure against the free end 19 causes the locking member 18 to flex. The locking member is provided with a locking portion 20 that fits into a cavity member 22 of the housing 14 to secure the module 12 to the housing. By applying pressure to each of the locking members toward each other, the free ends 19 of the locking portions 20 is released from the cavity members 22 to release the feature set module 12 from the interface module 15.

Positioned adjacent the locking members 18 on the interface module 15 are grooves 24 that are provided to facilitate attaching module 12 to the housing 14 or detaching module 12 from the housing 14. The module 12 may have one or more tabs 26 at one end of the feature set module 12. The housing 14 may have cavities 28 for accommodating the tabs.

Figure 2:
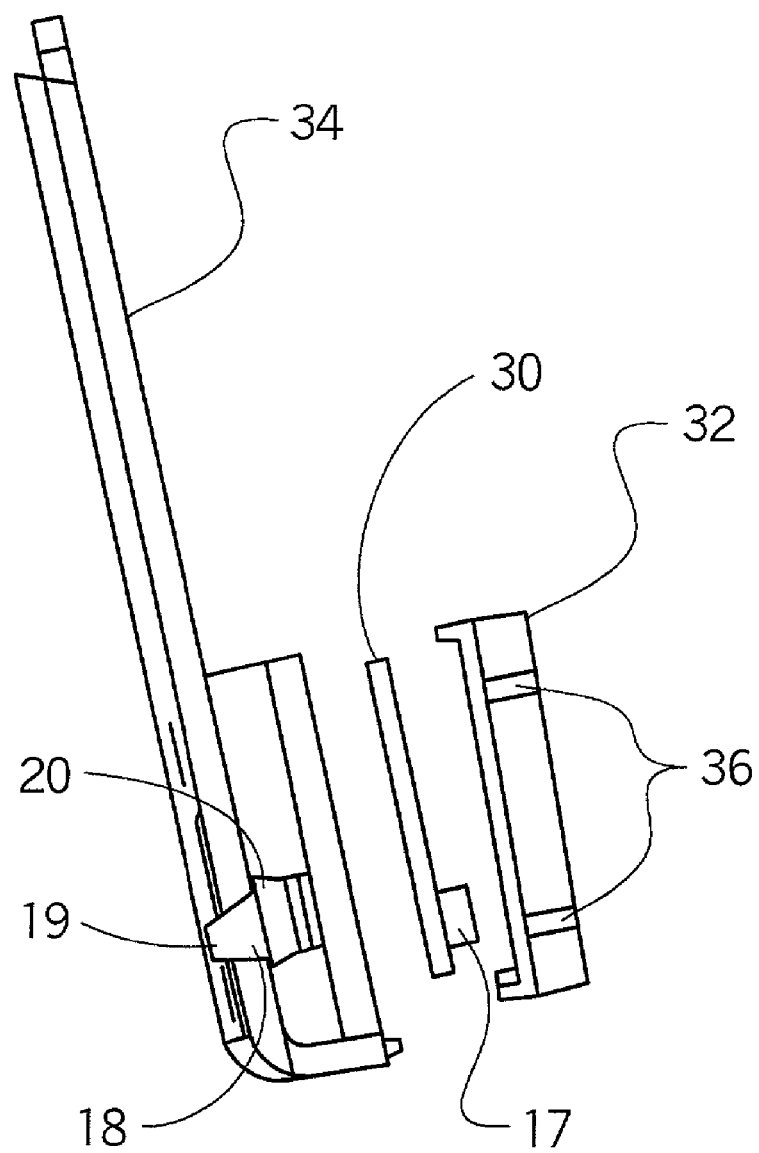
FIG. 2 is an exploded plan view of the side of a preferred embodiment of a feature set module, in accordance with the present invention.
Figure 3:
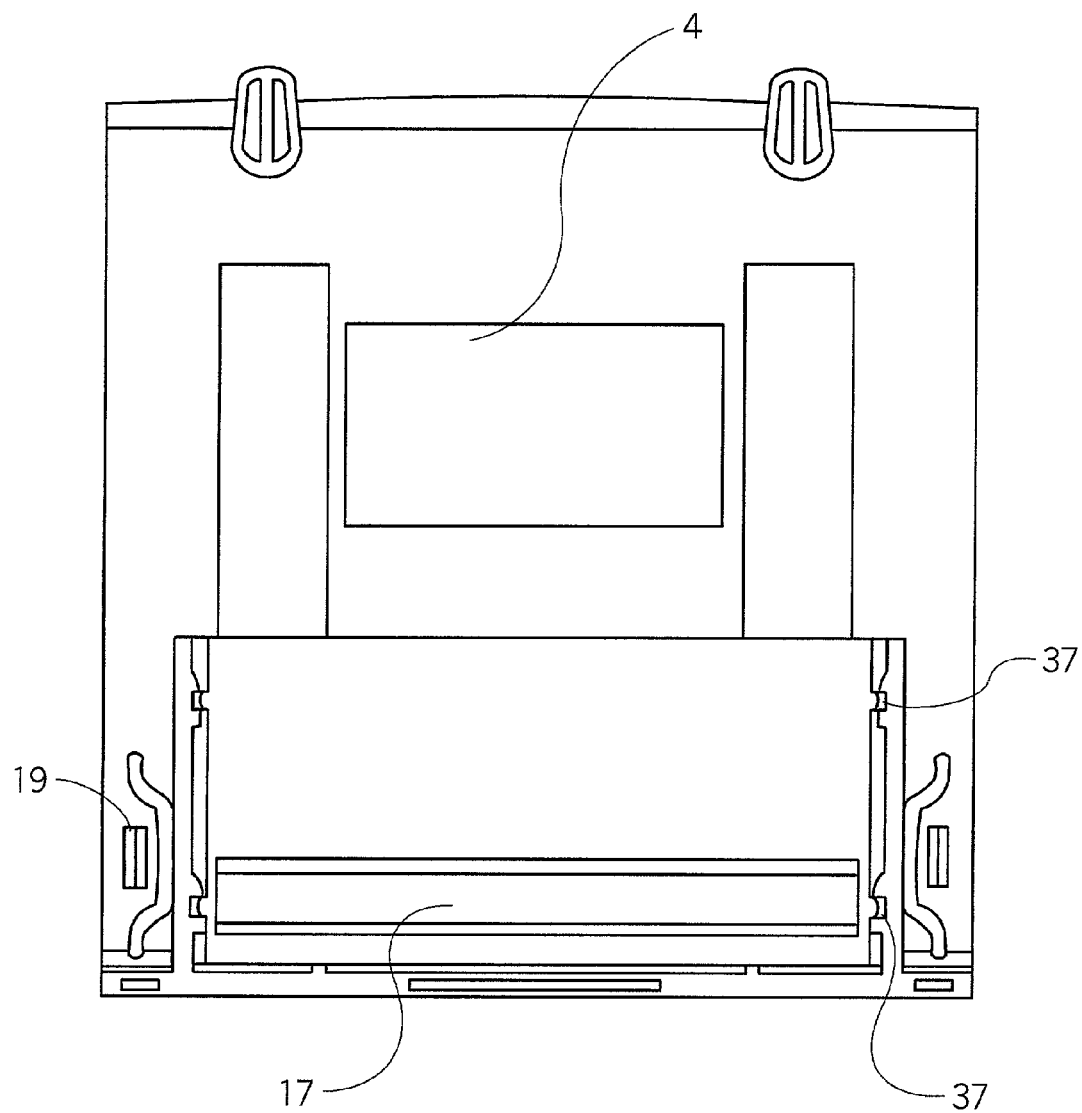
FIG. 3 is a plan view of a preferred embodiment of a feature set module, in accordance with the present invention.

The module 12 can be utilized for defining features or functions of the control system. The module 12 may also include circuitry for processing the features and functions that the module 12 is designed to provide. The module 12 is designed to be programmed for providing different features and functions. As shown in FIG. 2, the module 12 may include a circuit board 30 containing hardware and/or software for storing and processing the features/functions that the module 12 is to provide. Alternatively, an electrically erasable programmable read-only memory (EEPROM) device, a plug in module, a plug in read-only memory (ROM) device, or an external EEPROM device may be utilized to perform processing and/or storing functions. In an exemplary embodiment, as shown in FIG. 2, a circuit board can be accommodated in a bottom housing 32 of the module 12. The bottom housing 32 includes ridges 36 that fit within channels 37 in the top housing 34 for securing the bottom housing 32 to the top housing. Alternatively, the circuit board and/or the bottom housing may include a structure for securing the circuit board and/or the bottom housing 32 to the top housing 34. The bottom housing 32 is provided with an opening to allow access to the pin receptacle 17. An exemplary embodiment of the assembly of the top housing, circuit board and bottom housing is shown in FIG. 3.

Figure 4:
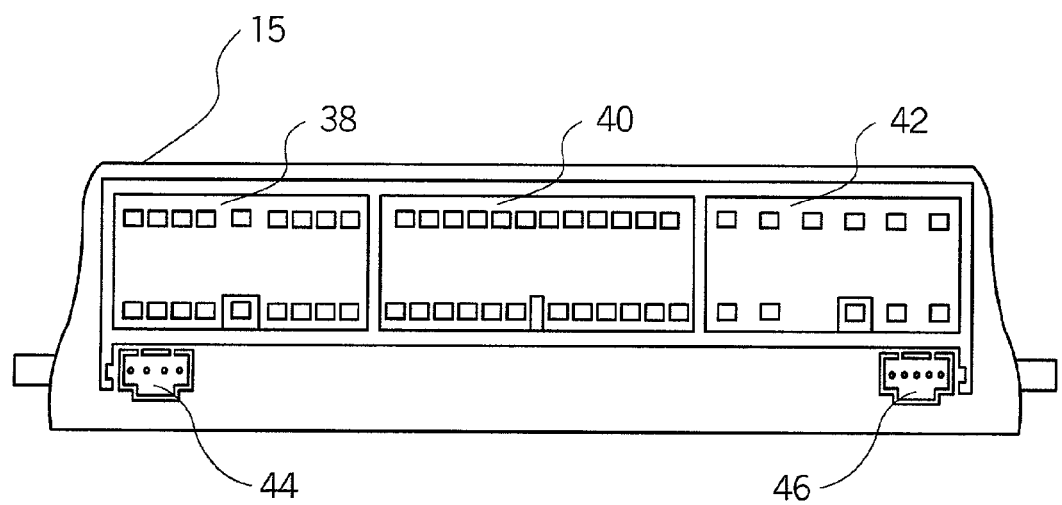
FIG. 4 is a plan view of an exemplary embodiment of a control system, in accordance with the present invention.

As shown in FIG. 4, the control system 10 may also include ports having pin receptacles that can be utilized to connect the interface module 15 and other components of the alarm system, e.g., siren, ignition system, motion sensor, lights, etc. In a vehicle control system, the module 12 may be used to configure safety, security, and other function/features related to a vehicle and/or a user of a vehicle. Thus, the electronic device 15 may serve as an input/output interface with relays and transistors to drive external loads, i.e., loads associated with a vehicle control system. The vehicle control system may also include various sensors, such as an on-board shock sensor and an interior theft sensor, which can be utilized to protect the vehicle's security, and which may be enabled by module 12. An example of an on-board shock sensor is described in U.S. Pat. No. 6,043,734 to Mueller et al., the disclosure of which is incorporated by reference. The electronic device 15 may also include a radio frequency (RF) receiver that is able to receive signals from a transmitter, so that the features/functions of the module and/or vehicle control system can be operated remotely. As shown in FIG. 4, the electronic device may have various ports for interfacing with external loads, such as a port to interface with a means for overriding a vehicle immobilizer, a port for interfacing with a multiplex module, and/or a port for interface with a hardware/software cartridge (48 in FIG. 5).

Five ports 38, 40, 42, 44, and 46 are shown in FIG. 4. In FIG. 4, port 38 is utilized to provide a number of auxiliary outputs to control features/functions, such as the opening and closing of windows, the turning on and off of headlights, etc. Port 40 interfaces with a hardware/software cartridge and is utilized for inputs and outputs used in security and keyless entry applications, such as those related to a door pinswitch monitor, ignition switches, 12V monitor, power, ground, siren output, etc. Port 42 is utilized to enable start feature sets, such as crank output, ignition feed, heater control feed, tachometer monitor input, etc. Port 44 is utilized as an auxiliary RF receiver connector port, and allows an alternative receiver to be connected to the system for the purpose of changing the frequency range and/or RF technology that will, for example, allow changing a distance from the vehicle that a user of a vehicle control system, in accordance with the present invention, will be able to activate and/or deactivate features of the vehicle control system. In an exemplary embodiment, a user will be able to extend the distance, for operation of the vehicle control system, to several thousand feet. Port 46 is utilized as a remote start security bypass module connection and provides inputs and outputs to control electronics that are responsible for overriding factory security systems before remote start can occur. Although five ports are shown in FIG. 4, the electronic device 15 may have more or less ports.

Figure 5:
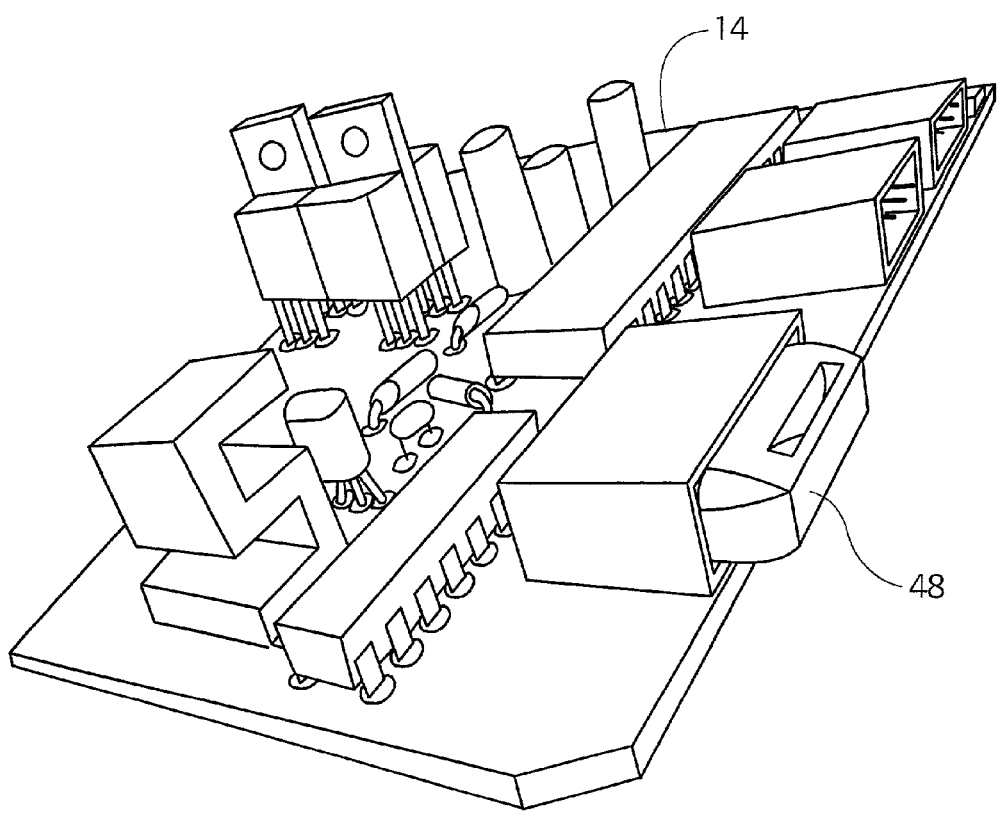
FIG. 5 is a perspective view of an exemplary embodiment of a control system including a software cartridge, in accordance with the present invention.

A separate exemplary embodiment of a software cartridge 48 is shown in FIG. 5. The software cartridge 48 is coupled to the interface module 15 through one of the ports 38–46 and can be programmed to enable module 12 to provide various features and functions. The module 12 can be used in conjunction with software cartridge 48 to produce vehicle control systems with different sets of features and functions. Upon attaching module 12 to housing port 16 on the electronic device 15, the software and/or hardware cartridge 48 can be utilized alone or in conjunction with module 12 to control and/or define functions associated with electronic system 10, such as a vehicle control system and/or a user of a vehicle control system. A vehicle control system according to the present invention can be utilized to provide, but is not limited to, the features/functions described herein. For example, the module 12 can be utilized to control security, safety, comfort and convenience functions related to a vehicle control system and/or a user of a vehicle control system, by programming the software cartridge 48 to provide various features and functions.

Figure 6:
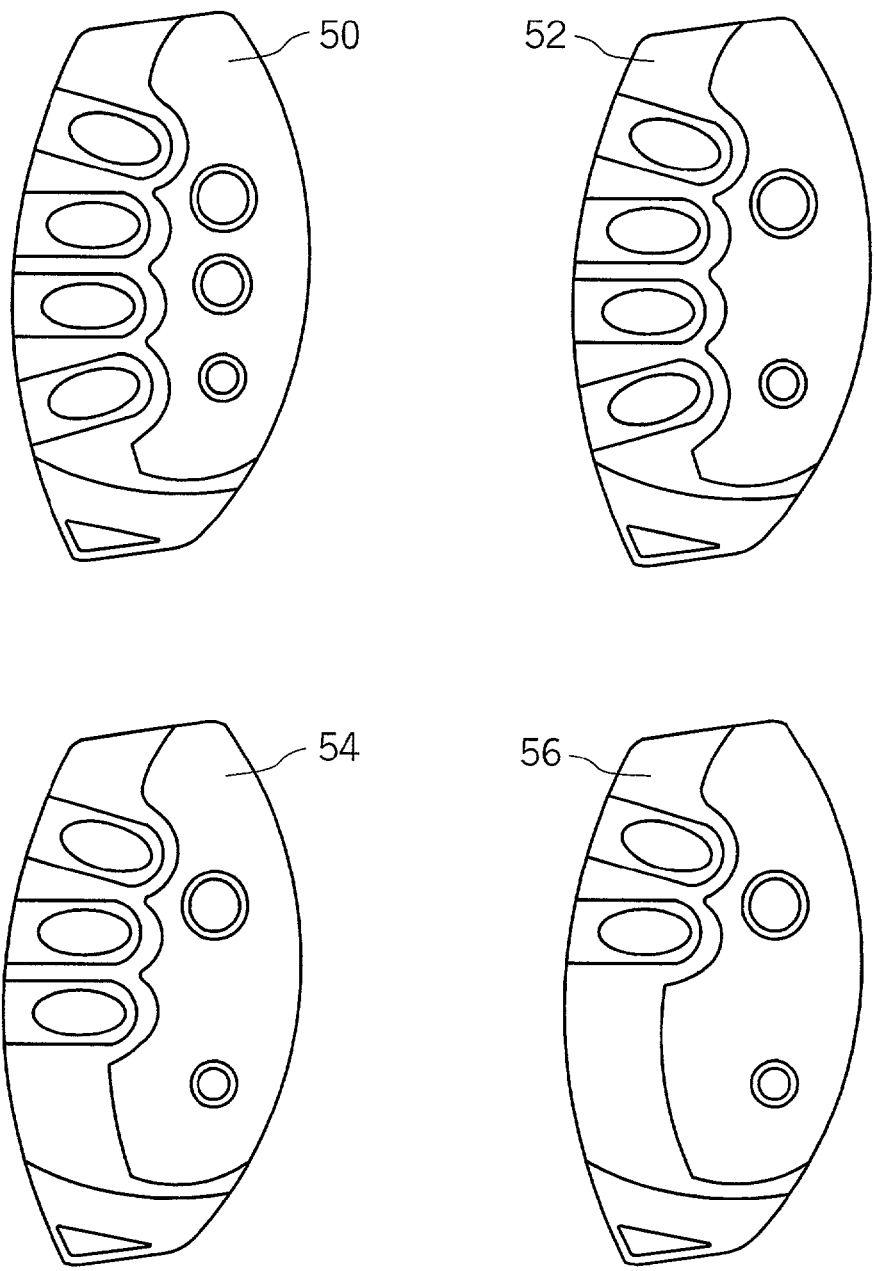
FIG. 6 is a plan view of exemplary embodiments of transmitters, in accordance with the present invention.

Further, an exemplary control system 10, according to the present invention, can be utilized to allow a transmitter, such as one of the transmitters 50, 52, 54, 56 as shown in FIG. 6, to remotely control the functions of the electronic system to be activating and/or deactivating functions, either automatically, by the use of a transmitter/remote control, or both. In general, the transmitter, according to the present invention, can send signals, and thus, allow a user to operate the transmitter to activate and/or deactivate certain features/functions of an electronic device 14. The transmitter may be configured to operate as a transceiver that is able to receive signals.

A module 12, according to the present invention can be programmed to allow a transmitter/remote control to be utilized for: 1) locking and unlocking doors with ignition off; 2) releasing a trunk or hatch; 3) disabling or enabling a starter; 4) flashing lights, such as parking lights; 5) controlling functions associated with one or more vehicles, for example, by use of a shift key located on the transmitter/remote control; 6) allowing one or more remotes to control a vehicle control system; 7) locking and unlocking doors with ignition on or off; 8) allowing service valet mode; 9) allowing for remote keyless entry in valet mode; 10) allowing for passive power door lock activation; 11) allowing for noise pollution control; 12) operating a siren or other sound indicators at various decibels, including 125 decibels; 13) providing one or more sounds, which progress in duration or decibel level, for example, for assistance with attempts to locate a vehicle; and 14) providing a remote vehicle start feature that allows for the starting of a vehicle remotely.

The module 12 may also be utilized to provide one or more physical, visual, or sound indications upon the occurrence of one or more of the following events in connection with a vehicle and/or user of a vehicle such as: 1) the unlocking of doors; 2) the unlocking of a trunk or hatch; 3) the detection of a predetermined amount or range of vibration that is indicative of unusual vibration occurring to a vehicle, as indicated by a shock sensor; 4) attempts to activate a starter that has been disabled; 5) attempts to deactivate a starter that has been enabled; 6) acts occurring within the interior of a vehicle, as indicated by an interior theft sensory that could be associated with attempts of theft; 7) acts to engage the brake of a vehicle when the brake has been deactivated; and 8) impacts to the vehicle of various degrees.

In addition, in an exemplary embodiment of a vehicle control system 10, according to the present invention, a module 12 can be programmed to provide, for example, one or more physical, visual, or sound indicators, with or without the occurrence of any one or more of the above described events. For example, a module 12, according to the present invention, can be programmed to contribute to control: 1) the flashing of lights on a vehicle at various speeds, such as the parking lights; 2) the emission of emitting sounds from a vehicle, such as one or more chirps, musical notes, portions of songs, and/or human-voice sounds upon the arming or disarming of features of a vehicle control system; 3) the illumination of one or more entries to a vehicle; 4) the illumination of one or more exits from a vehicle; 5) the honking of a horn of the vehicle; 6) the activation of a human-voice and/or real panic-like sound from a vehicle component, such as a horn; and 7) the sounding of an alarm for one or more periods of times.

The module 12 may also be utilized to program other functions/features of a vehicle control system according to an exemplary embodiment of the present invention. Both the following and above described features may be integrated within the vehicle control system or designated by a module 12 to be output from one or more auxiliary or unused ports. For example, module 12 may also be programmed to contribute to controlling the following features/functions: 1) starting a car remotely; 2) illuminating lights of a vehicle, such as headlights remotely; 3) operating a power sliding door; 4) operating a power sunroof; 5) operating a power window; 6) operating a vehicle seat, for example, placing the seat in a position, according to the seat position stored in the memory of the module and/or vehicle control system; 7) unlocking one or more doors, such as the driver's door before unlocking other doors; 8) overriding an interior theft sensor; 9) reducing the current usage from the vehicle control system; 10) placing the vehicle control system in hibernation sleep mode to avoid drain on the battery; 11) interfacing with a home control system; 12) interfacing with a garage control system; 13) interfacing with other alarm or control systems, which may be produced by other manufacturers; 14) identifying which sensors have been tripped; 15) deactivating lost remote controls/transmitters associated with a vehicle control system; 16) securing an emergency override button; 17) engaging the starter motor anti-grind circuit; 18) controlling front and rear window defrosters; 19) controlling hood pin switch safety features; 20) to control neutral safety switch input; 21) to placing the vehicle in diesel mode, which will determine how long to activate the starter; and 22) selecting how long to activate a vehicle's starter according to a particular vehicle's requirements.

The control system 10 also provides for serial communication inputs and outputs, which may be referred to as a multiplex input/output system. The multiplex input/output system provides a method of communication with accessories or ancillary control modules via a 2-way-3-wire connection. This allows for complex command sets to be sent and/or received via a low number of inputs and outputs. The serial communication inputs and outputs can be utilized to interface with hand-held electronic devices, various telematics products, such as cell phones, vehicle control modules, etc.

The control system 10 also provides for a high security code override feature. The feature provides for a simple bypass of the security code access requirement in case of the loss of or damage to the remote control transmitter. The simple bypass uses a hidden button in conjunction with the ignition being in the "on" state. The high security code override feature may require that certain inputs and outputs be stimulated in a sequence by the user. Performing the function or functions that constitute the high security code override will correspond to inputting a PIN that will allow the system to disarm.

The control system 10 may include one or more circuits, including a microprocessor and support circuits, mounted on a circuit board. For example, the support circuits may include LVI, electrically erasable programmable read only memory device (EEPROM) 68, clock, and watchdog circuit. The support circuits may either be discrete circuits or circuits integral to the microprocessor circuit. The input/output lines of the circuitry may have a series resistance in each line to protect the module circuitry from ESD charges. In addition, every connection that is an input to the microprocessor may be associated with a pull-up or pull-down resistor.

As explained herein, the circuitry of the module 12 can be programmed or configured to provide a variety of features and functions. The following chart illustrates the possible functionality of each pin receptacle of the module 12:

| Port | Function | I/O | DIP pin | QFP pin | H1 | H2 | H3 | H4 | H5 | H6 | Programmer |
|---|---|---|---|---|---|---|---|---|---|---|---|
| PB0 | Shock LED | Output | 1 | 40 | 19 | | | | | | |
| PB1 | RF Power Save | Output | 2 | 41 | 11 | | | | | | |
| PB2 | Factory Arm | Output | 3 | 42 | 39 | 2 | | | | | |
| PB3 | Factory Disarm | Output | 4 | 43 | 40 | 4 | | | | | |
| PB4 | Door Trigger | Input | 5 | 44 | 12 | | 20 | | | | |
| PB5 | Parking Lights | | 6 | 1 | 15 | | 1 | | | | MOSI |
| PB6 | 2nd Door Unlock | Output | 7 | 2 | 10 | | 24 | | | | MISO |
| PB7 | Trunk Pin | Input | 8 | 3 | 5 | 8 | | | | | SCK |
| | External Sensor | | | | | 15 | | | | | |
| *RESET | *Reset/LVI | Input for Programming | 9 | 4 | 43 | | | | | | *Reset |
| PD0 | Green LED (LED2) | Output | 10 | 5 | 37 | | 22 | | | | |
| | Multiplex In | | | | | 6 | | | | | |
| PD1 | Red LED (LED1) | Output | 11 | 7 | 13 | | 23 | | | | |
| | Multiplex Out | | | | | | 10 | | | | |
| PD2 | Shock Sense | Input | 12 | 8 | 16 | | | | | | |
| PD3 | Tach In | Input | 13 | 9 | 27 | | | 9 | | | |
| PD4 | Lock Motor Sense (Rogue Arm) | Input | 14 | 10 | 2 | | 2 (dup) | | | | |
| | Brake | | | | | | | 7 | | | |
| PD5/OC1A | Siren | Output | 15 | 11 | 14 | 16 | | | | | |
| PD6 | Dome Light | Output | 16 | 12 | 32 | 3 | | | | | |
| PD7 | Lock Switch Sense | Input | 17 | 13 | 6 | 11 | | | | | |
| | (CSM Ext Trigger) | | | | | | | | | | |
| PA0 | Ignition 1/Ignition 2 | Output | 39 | 37 | 25 | | 7 (dup)/— | —/3 | | | |
| | HVAC 1/HVAC 2 | | | | | | —/— | 4/5 | | | |
| PA1 | Ignition Key | Input | 38 | 36 | 28 | | 7 (dup) | | | | |
| PA2 | Car Start Active | Output | 37 | 35 | 7 | | | 10 | | | |
| PA3 | Aux 1 | Output | 36 | 34 | 29 | 10 | 9 | | | | |
| PA4 | Aux 2 | Output | 35 | 33 | 8 | 11 | | | | | |
| PA5 | Aux 3 | Output | 34 | 32 | 30 | 12 | | | | | |
| PA6 | Aux 4 | Output | 33 | 31 | 9 | 13 | | | | | |
| PA7 | Unlock Motor | Input | 32 | 30 | 31 | | 14 (dup) | | | | |
| | Sense (Rogue Disarm) | | | | | | | | | | |
| | Trunk Sense | | | | | | 13 (dup) | | | | |
| | Starter Key | | | | | | 6 | | | | |
| ICP | RF In | Input | 31 | 29 | 33 | | | 4 | | | |
| OC1B | Horn | Output | 29 | 26 | 36 | 21 | | | | | |
| PC0 | Starter Kill | Output | 21 | 18 | 41 | | | | | | |
| | Armed Out | | | | | 14 | | | | | |
| PC1 | Trunk Release | Output | 22 | 19 | 38 | | 13 (dup) | | | | |
| PC2 | Lock | Output | 23 | 20 | 17 | | 2 (dup) | | | | |
| PC3 | Unlock | Output | 24 | 21 | 18 | | 14 (dup) | | | | |
| PC4 | Unlock Switch Sense | Input | 25 | 22 | 3 | 12 | | | | | |
| | Neutral Safety | | | | | | | 8 | | | |
| PC5 | Hood Pin | Input | 26 | 23 | 34 | 19 | | | | | |
| PC6 | Disarm/Override Button | Input | 27 | 24 | 35 | 18 | | | | | |
| PC7 | Starter Motor Drive | Output | 28 | 25 | 4 | 8 | | | | | |
| VCC | | | 40 | 38 | 22, 23 | | | | | | VCC |
| GND | | | 20 | 16 | 1, 44 | | | | | | GND |
| XTAL2 | | | 18 | 14 | | | | | | | |
| XTAL1 | | | 19 | 15 | | | | | | | |
| ALE | | | 30 | 27 | | | | | | | |
| N/c | | | | | 20 | | | | | | |
| N/c | | | | | 21 | | | | | | |
| N/c | | | | | 24 | | | | | | |
| N/c | | | | | 26 | | | | | | |
| N/c | | | | | 42 | | | | | | |
| | Lock Switch (87a) | | | | | | 1 | | | | |
| | Unlock Switch (87a) | | | | | | 3 | | | | |
| | n/c | | | | | | 5 | | | | |
| | n/c | | | | | | 7 | | | | |
| | Trunk Switch (87a) | | | | | | 9 | | | | |

-continued

| Port | Function | I/O | DIP pin | QFP pin | H1 | H2 | H3 | H4 | H5 | H6 | Programmer |
|---|---|---|---|---|---|---|---|---|---|---|---|
| | Door Trigger Pull-Up | | | | | | 16 | | | | |
| | +Battery | | | | | | 4 | | | | |
| | Ground | | | | | | 5 | | | | |
| | Siren Feed | | | | | | 15 | | | | |
| | Disarm Ground | | | | | | 17 | | | | |
| | HVAC polarity 2 | | | | | | | 1 | | | |
| | HVAC polarity 1 | | | | | | | 2 | | | |
| | n/c | | | | | | | 6 | | | |
| | RC Power | | | | | | | | 1 | | |
| | GND RF | | | | | | | | 2 | | |
| | RC Kill | | | | | | | | 3 | | |
| | +12 v | | | | | | | | | 1 | |
| | GND Chassis | | | | | | | | | 2 | |
| | PATS Ignition | | | | | | | | | 3 | |
| | PATS Starter Motor | | | | | | | | | 4 | |
| | PATS Active Out | | | | | | | | | 5 | |

FIG. 7 illustrates the numbering system of port 17 of module 12, in accordance with the present invention. In an exemplary embodiment, port 17 includes up to 44 receptacles, positioned and sized to receive and correspond to one or more pins of port 16 of housing 14 of the alarm system 10. The pin receptacles of the connector 17 form two rows in parallel, such that each pin receptacle is positioned to be numbered corresponding to a position of a pin in one of the rows of the pin connector of the housing 14. Likewise, the pin connector of port 16 of housing 14, has two rows of pins, positioned to be numbered corresponding to a position of a pin receptacle of the feature set module 12. One of the rows includes receptacle positions 1–22, and the other now includes positions 23–44. For the connector of the feature set module 12, pin receptacle positions 1 and 40 are located opposite each other at one end of each row, and receptacle positions 23 and 24 are also located opposite each other at the other ends end of each row. Likewise, for the pin connector of the housing 14, pin positions 1 and 44 are located opposite each other at one end of each row, and pin positions 23 and 24 are also located opposite each other at the other ends of each row. The connection may be serial or parallel. Further, it is not necessary that the connector of the feature set module 12 contain 44 pin receptacles. Similarly, it is not necessary that the connector of the interface module 15 contain 44 pins. Rather, at least one pin receptacle of the feature set module 12 must have corresponding functionality as follows:

In accordance with an exemplary embodiment of the present invention, at least one of the receptacles corresponds to positions 1–24, and such receptacle or receptacles relates to ground.

In accordance with another exemplary embodiment of the present invention, at least one of the receptacles corresponds to positions 1–24, and such receptacle or receptacles relates to power.

In accordance with another exemplary embodiment of the present invention at least one of the receptacles corresponds to positions 1–24, and such receptacle or receptacles relate to the starter motor.

In accordance with another exemplary embodiment of the present invention, at least one of the receptacles corresponds to positions 1–24, and such receptacle or receptacles relate to parking lights.

In accordance with another exemplary embodiment of the present invention, at least one of the receptacles corresponds to positions 1–24, and such receptacle or receptacles relate to locking the doors and/or arming features of a vehicle's control system.

In accordance with another exemplary embodiment of the present invention at least one of the receptacles corresponds to positions 1–24, and such receptacle or receptacles relate to unlocking and/or disarming features of a vehicle's control system.

An electronic system according to the present invention can be utilized to define features/functions of a vehicle control system. The programmable features described above provide a variety of safety, security, comfort and convenience functions to a vehicle control system and/or user of a vehicle control system. For example, according to the present invention, a module can be programmed to enable one transmitter to operate the vehicle control systems of up to two vehicles. Therefore, a user of two vehicles will not have a different transmitter for each vehicle. In addition, up to eight transmitters can be programmed to control a single module. Also, the features or functions provided by a vehicle control system in accordance with the present invention, may be determined by settings of the transmitter.

Another programmable feature according to the present invention is the ability to lock and unlock power doors and or sliding doors using a transmitter. Thus, a user of a vehicle control system can lock and unlock doors without a key.

Another feature of a module according to the present invention is the ability to prioritize which doors will be unlocked first. Additionally, a module may be programmed to enable the delivery of a sound or emission of light upon the locking and unlocking of a door and/or the arming and/or disarming of a security system. Thus, a user will be able to audibly or visibly verify the performance of the respective function.

Additionally, a module may be programmed to enable the starting of vehicle by using a transmitter. Thus, a user will be able to start a vehicle without using a key. In addition, a user may be able to start a vehicle without using a key, and maintain the arming of security features, such as locked doors.

Also, because a module can be programmed to deliver visual, physical and/or sound indicators upon the occurrence or non-occurrence of an event when, for example, sensors, such as a light touch detector or interior theft detector are activated, the module may be programmed to deliver one or more of physical, sound, or visuals indicators. The delivery of one or more indicators, upon the activation of a sensor, will serve as a deterrent to threats to the security of a vehicle or safety of a user.

Another feature that may be programmed by a module, according to the present invention is the ability to deactivate lost remotes. This feature will also serve to protect the safety and security of a vehicle and/or user of a vehicle.

It should also be appreciated that a module may be reset or contain inputs/outputs for the addition and/or changing of functions that the module can be programmed to provide. This is especially important because the requirements of a user of a vehicle control system may change. In addition, as technology evolves, a user of a vehicle control system may desire additional or evolved features. According to a module according to the present invention, the many features described herein, and others, may be programmed into the feature set module 12.

Importantly, a module 12 and/or a software cartridge 48, according to the present invention, can be easily programmed. For example, a module 12, according to the present invention may be programmed using the Internet or an intranet. For example, a module 12 and/or a software cartridge 48 may be programmed using the Internet by establishing communication between a computer processing device, the Internet and a module 12 and/or a software cartridge 48. For example, consumers utilizing the Internet may pay for the ability to configure the vehicle control system over the Internet, enter an identification number corresponding to the type or configuration of the module 12 and/or a software cartridge 48 that is in the consumer's possession, and download the features desired to the module 12 and/or a software cartridge 48 directly or indirectly using the Internet. It should also be appreciated that the module 12 and/or a software cartridge 48 could be programmed using a software package, such as one stored on a computer processing device, instead of the Internet.

It should be understood that the features of a vehicle control system 10, in accordance with the present invention, can be programmed using a variety of methods including 1) use of an on-board processor or an external device, that can be programmed by establishing RF communication; or 2) use of a telematics device that can program the features of the vehicle control system 10 via software present with the telematics product or software residing on the internet, which may be in direct connection with the telematics product.

Additionally, because a feature set module 12 and/or a software cartridge 48 can be easily programmed, directly or indirectly, using software accessible through the Internet, an intranet, or a computer, a vehicle control system according to the present invention can be adapted to meet the desires of many users, by simply programming different feature sets into the module 12 and/or the software cartridge 48. The interface module 15 is universal device, and is designed to accommodate any feature that a user desires.

Often, the features that have high priority among users tend to be similar for users in different locales. Thus, an interface module 15 can be an original equipment alarm device in vehicles that allows dealers of vehicles to configure the features of the alarm system according to the features desired by users in their region. In addition, a dealer can provide an extra service to their customers by being able to configure features that are unique to a particular purchaser. As a result, an original manufacturer of a vehicle does not have to pre-configure different features for vehicles, according to who the vehicle will be sold. Thus, the original manufacturer of a vehicle will have additional flexibility in selling the manufactured vehicles without being limited to only selling certain vehicles to certain dealerships.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle control system, comprising:
an interface module for interfacing with an electronic input and output device of a vehicle, wherein the electronic input and output devices are operated pursuant to a feature set of electronically operable functions; and
a feature set module for detachably coupling to said interface module, wherein said feature set module comprises codes for defining the feature set of electronically operable functions, wherein the electronic input and output devices of the vehicle are operated pursuant to the feature set of electronically operable functions when the feature set module is coupled to the interface module.

2. The vehicle control system of claim 1, wherein the codes for defining the feature set of electronically operable functions are remotely programmed.

3. The vehicle control system of claim 2, wherein the codes for defining the feature set of electronically operable functions are remotely programmed by a computer.

4. The vehicle control system of claim 1, wherein the feature set module further comprises:
a memory device for storing the codes for defining the feature set of electronically operable functions, wherein the memory device is remotely accessed.

5. The vehicle control system of claim 4, wherein the memory device is an electrically erasable programmable read-only memory.

6. The vehicle control system of claim 1, further comprising:
a remote transmitter for performing one of remotely controlling and programming a code associated with a function of the feature set of electronically operable functions.

7. The vehicle control system of claim 6, wherein the function is determined by a setting of the remote transmitter.

8. The vehicle control system of claim 6, wherein the remote transmitter remotely programs the feature set module to provide a different function to the feature set of electronically operable functions.

9. The vehicle control system of claim 6, wherein the remote transmitter comprises:
a transceiver for performing one of transmitting signals to the interface module and receiving signals from the interface module.

10. The vehicle control system of claim 1, wherein the interface module comprises:
a transceiver for wirelessly receiving signals from an external device.

11. The vehicle control system of claim 10, wherein the transceiver is a radio frequency (RF) transceiver.

12. The vehicle control system of claim 1, further comprising:
a software cartridge for detachably coupling to the interface module, wherein the software cartridge comprises codes for defining the feature set of electronically operable functions.

13. The vehicle control system of clam 12, wherein the software cartridge is remotely programmed.

14. The vehicle control system of claim 1, wherein the interface module receives an external signal via telematics.

15. A method of remotely communicating with a vehicle control system comprising an interface module for interfacing with an electronic input and output device of a vehicle, and a feature set module for detachably coupling to said interface module, wherein said feature set module comprises codes for defining a feature set of electronically operable functions to operate the electronic input and output devices when the feature set module is coupled to the interface module, comprising the steps of:
receiving codes, at the interface module, for performing one of programming and controlling a function of the feature set of electronically operable functions; and
executing the received codes, at the interface module, for performing one of programming and controlling a function of the feature set of electronically operable functions.

16. The method of claim 15, wherein the received codes are transmitted wirelessly by one of a remote transmitter and computer.

17. The method of claim 15, wherein the received codes are received at a wireless interface.

18. The method of claim 15, further comprising:
storing, at the interface module, the received codes in a memory.

19. The method of claim 15, further comprising:
transmitting, from the interface module, a signal associated with the received codes to a remote transmitter in communication with the vehicle control system.

20. A method of performing one of controlling and programming a vehicle control system comprising an interface module for interfacing with an electronic input and output device of a vehicle, and a feature set module for detachably coupling to said interface module, wherein said feature set module comprises codes for defining a feature set of electronically operable functions to operate the electronic input and output devices when the feature set module is coupled to the interface module, comprising the steps of:
determining, at a remote transmitter, a code to be transmitted to the interface module for performing one of controlling and programming, wherein the code to be transmitted is associated with a function in the feature set of electronically operable functions; and
transmitting, to the interface module, the determined code for performing one of controlling and programming.

21. The method of claim 20, wherein the code is determined by a setting of the remote transmitter.

22. A vehicle control system, comprising:
an interface module for interfacing with an electronic input and output device of a vehicle, wherein the electronic input and output devices are operated pursuant to a feature set of electronically operable functions; and
a software cartridge for detachably coupling to said interface module, wherein said software cartridge comprises codes for defining the feature set of electronically operable functions, wherein the electronic input and output devices of the vehicle are operated pursuant to the feature set of electronically operable functions when the software cartridge is coupled to the interface module.

23. The vehicle control system of claim 22, wherein the software cartridge is remotely programmed.

* * * * *